United States Patent [19]

Kurabayashi et al.

[11] Patent Number: 5,086,373
[45] Date of Patent: Feb. 4, 1992

[54] ELECTRIC DOUBLE LAYER CAPACITOR

[75] Inventors: Ken Kurabayashi, Chigasaki; Yoshinobu Tsuchiya, Fujisawa; Akio Yoshida, Kamakura; Hitoshi Koizumi, Hiratsuka; Yoriaki Niida, Yamato, all of Japan

[73] Assignee: Isuzu Motors Limited, Tokyo, Japan

[21] Appl. No.: 573,694

[22] Filed: Aug. 28, 1990

[30] Foreign Application Priority Data

Sep. 7, 1989 [JP] Japan .................................. 1-232243

[51] Int. Cl.5 ................................................ H01G 9/02
[52] U.S. Cl. .................................... 361/502; 29/25.03
[58] Field of Search ............... 361/502, 504, 523, 524, 361/323; 29/25.03

[56] References Cited

U.S. PATENT DOCUMENTS

| | | | |
|---|---|---|---|
| 3,652,902 | 3/1972 | Hart et al. | 361/502 |
| 3,656,027 | 4/1972 | Isley | 361/502 |
| 4,542,444 | 9/1985 | Boland | 361/502 |
| 4,562,511 | 12/1985 | Nishino et al. | 361/323 |
| 4,594,758 | 6/1986 | Watanabe et al. | 361/502 |
| 4,605,989 | 8/1986 | Marse et al. | 361/502 |
| 4,697,224 | 9/1987 | Watanabe et al. | 361/502 |
| 4,814,946 | 3/1989 | Su | 361/523 |

OTHER PUBLICATIONS

European Search Report, EP 90 30 9326, 1/1991.
Electronic Design, vol. 30, No. 20, 9/1982, pp. 159–164.
International Application Published (PCT) WO-A-8 808 612, 11/1988.

Primary Examiner—Donald A. Griffin
Attorney, Agent, or Firm—Staas & Halsey

[57] ABSTRACT

An electric double layer capacitor has two polarized electrodes each comprising a porous sintered body, and two current collectors each made of an electrically conductive material composed of a base and electrically conductive fine particles mixed in the base. The current collectors are held in contact with surfaces of the polarized electrodes and enter pores of the polarized electrodes.

5 Claims, 1 Drawing Sheet

ELECTRIC DOUBLE LAYER CAPACITOR

BACKGROUND OF THE INVENTION

The present invention relates to an electric double layer capacitor of high electrostatic capacitance which utilizes the principles of an electric double layer.

Recently, high-capacitance capacitors based on the electric double layer principles have been developed as backup power supplies for memories in electronic systems, and are widely used with microcomputers and IC memories.

One type of electric double layer capacitor is disclosed in U.S. Pat. No. 3,536,963, for example. FIG. 4 of the accompanying drawings shows the structure of the disclosed electric double layer capacitor. The electric double layer capacitor comprises a single basic cell composed of a pair of current collectors 20 of an electron conductor which serves as a pair of collector electrodes, a pair of carbon electrodes 10 made of activated carbon particles, a nonconductive gasket 30, and a separator 40 positioned between the carbon electrodes 10 for preventing electrons from moving between the carbon electrodes 10. The carbon electrodes 10 are made as paste electrodes from a concentrated slurry which is a mixture of powdery or particulate activated carbon and an electrolyte. The electrolyte has three functions to perform. It serves as a promoter of ion conductivity, an ion source, and a binder for the carbon particles.

It is important that the internal resistance of an electric double layer capacitor be low. The internal resistance of an electric double layer capacitor is greatly affected by the contact resistance of active carbon of the polarized electrodes and the contact resistance between the collector electrodes and the polarized electrodes.

Therefore, in order to reduce the internal resistance of the polarized electrodes and the contact resistance between the collector and polarized electrodes, each basic cell should be kept under vertical pressure to bring the particles of the paste activated carbon into good electric contact with each other. Conventional electric double layer capacitors require each cell to be kept under a pressure of about 100 kg/cm$^2$, though it depends on the size of the electrodes, the size of the particles of the carbon material, or the kind of the electrolyte used. In prior electric double layer capacitors, the cells are kept under pressure by deforming the outer cases of the capacitors or bonding the current collectors strongly to gaskets. If an electric double layer capacitor is to be used as a large-capacitance capacitor, e.g., a power supply for energizing a motor, then it is necessary to increase the cross-sectional areas of the electrodes of the basic cell. Therefore, the pressure to be applied to the basic cell has to be increased. Increasing the pressure, however, causes some practical problems such as the selection of means for applying the pressure and the need for high rigidity for the outer cell which houses the basic cell.

SUMMARY OF THE INVENTION

It is an object of the present invention to provide an electric double layer capacitor having an electric double layer composed of an interface between polarized electrodes and an electrolyte, the electric double layer capacitor having a reduced internal resistance of the polarized electrodes and a reduced contact resistance between collector and polarized electrodes.

According to the present invention, there is provided an electric double layer capacitor having an electric double layer composed of an interface between polarized electrodes and an electrolyte, comprising at least two polarized electrodes each comprising a porous sintered body, the polarized electrodes having surfaces disposed out of contact with each other in confronting relationship, two current collectors each made of an electrically conductive material composed of a base and electrically conductive fine particles mixed in the base, the current collectors being held in contact with other surfaces of the polarized electrodes and entering pores of the polarized electrodes, and a gasket disposed between the current collectors and surrounding the polarized electrodes, the gasket being joined to peripheral edges of the current collectors.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
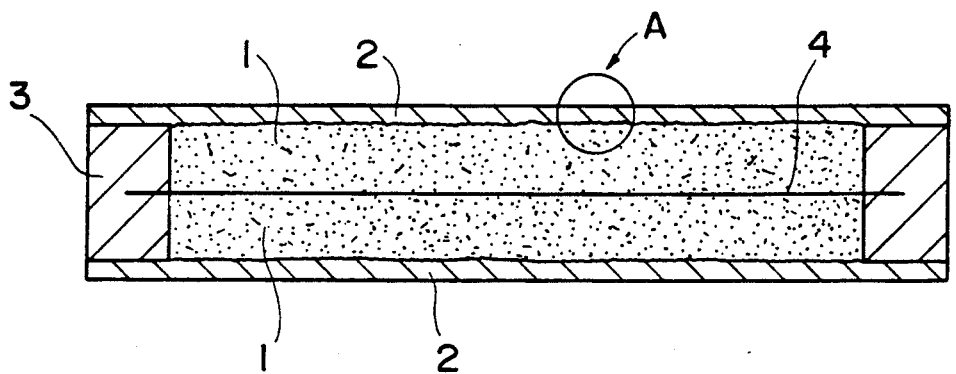
FIG. 1 is a cross-sectional view of an electric double layer capacitor according to an embodiment of the present invention.
Figure 2:
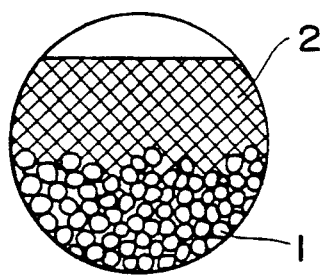
FIG. 2 is a enlarged view of an encircled area A in FIG. 1.

FIG. 1 cross-sectionally shows an electric double layer capacitor according to an embodiment of the present invention, and FIG. 2 shows at enlarge scale an encircled area A in FIG. 1.

As shown in FIGS. 1 and 2, the electric double layer capacitor has a pair of polarized electrodes 1 each in the form of a porous plate-like electrode body which is made of fine particles of activated carbon by firing or a sintering process, such as plasma spraying, the electrode body being impregnated with an electrolyte. Since the particles are joined together in the electrode body, the internal resistance of the polarized electrodes 1 is low. The surface area of the polarized electrodes 1 is very large since they are porous. The polarized electrodes 1 have confronting surfaces which are disposed out of contact with each other. Between the polarized electrodes 1, there is interposed a separator 4 made of nonwoven fabric such as of polypropylene, for keeping the polarized electrodes 1 out of contact with each other thereby to prevent electrons from moving between the polarized electrodes 1 while allowing ions to move therebetween. The polarized electrodes 1 and the separator 4 are disposed in a gasket 3 which surrounds them.

A pair of current collectors 2 is held in contact with the other surfaces of the polarized electrodes 1, respectively. The current collectors 2 are fabricated as follows: Electrically conductive fine particles are mixed into unvulcanized rubber as a base, and the mixture is attached to the electrodes 1 by hot curing. The material of the current collectors 2 thus enters the pores of the porous electrode bodies, and the peripheral edges of the current collectors 2 are secured in tight intimate contact with the entire circumferential edges of the gasket 3. Since the current collectors 2 enter the fired or sintered activated carbon electrodes 1, as shown in FIG. 2 at enlarged scale, the current collectors 2 are held in contact with the electrodes 1 through a very wide area, and hence the contact resistance between the current collectors 2 and the electrodes 1 is very low.

The electric double layer capacitor which is constructed as described above offers various advantages given below. Because the electrode bodies are made of particulate activated carbon by firing or sintering, the particles of the material are joined together, and the internal resistance of the electrode bodies is low.

The current collectors are fabricated by bringing unvulcanized rubber with electrically conductive particles mixed therein into contact with the porous electrode bodies and then holding the rubber into close contact with the electrode bodies by hot curing. Therefore, the electrically conductive rubber flows into the pores of the porous electrode bodies. The area through which the electrode bodies and the current collectors contact each other is therefore large, resulting in a concomitant reduction in electric contact resistance therebetween.

As the electrode bodies are impregnated with an electrolyte, electric charges stored in the wide surface of the porous electrode bodies can be extracted through the low internal resistance of the electrode bodies and the low contact resistance between the electrode bodies and the current collectors. Accordingly, the electric double layer capacitor is of a high electrostatic capacitance and a low internal resistance, and it is not necessary to place the electric double layer capacitor under a high pressure which would otherwise be required to reduce the internal resistance and the contact resistance as is the case with the conventional capacitor.

Figure 3:
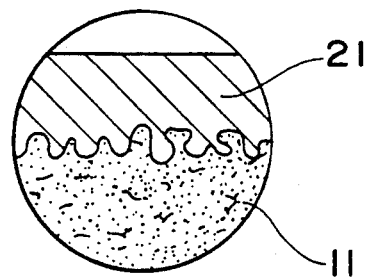
FIG. 3 is an enlarged view similar to FIG. 2, showing an electric double layer capacitor according to another embodiment of the present invention.
Figure 4:
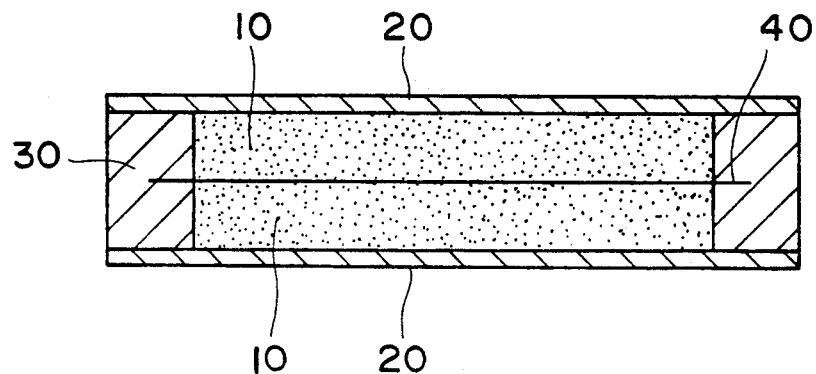
FIG. 4 is a cross-sectional view of a conventional electric double layer capacitor.

FIG. 3 shows at enlarged scale the manner in which a porous electrode and a current collector are joined in an electric double layer capacitor according to another embodiment of the present invention.

In FIG. 3, an electrode 11 is in the form of a porous plate-like electrode body made of fine particles of activated carbon by sintering and impregnated with an electrolyte. A current collector 21 is prepared by mixing fine particles of carbon into a synthetic resin monomer, such as epoxy resin, coating the mixture to the electrode body, and solidifying the coated mixture with heat or at normal temperature, thus holding the mixture as the current collector in close contact with an entire peripheral edge of a gasket. Since the material of the current collector 21 which is rendered electrically conductive by the mixed carbon particles enters the pores of the porous electrode body and is solidified in contact therewith, the electrode 11 which is impregnated with the electrolyte and the current collector 21 are held in contact with each other through a wide area. Consequently, the contact resistance between the electrode 11 and the current collector 21 is of a very low value.

Although certain preferred embodiments have been shown and described, it should be understood that many changes and modifications may be made therein without departing from the scope of the appended claims.

What is claimed is:

1. An electric double layer capacitor having an electric double layer, comprising:
    two polarized electrodes each comprising a porous sintered body, said polarized electrodes having first surfaces disposed out of contact with each other in confronting relationship, and said polarized electrodes having second surfaces having pores;
    two current collectors each made of an electrically conductive material including a base and electrically conductive fine particles mixed in said base, said current collectors contacting said second surfaces of said polarized electrodes and entering said pores of said second surfaces of said polarized electrodes; and
    a gasket disposed between said current collectors and surrounding said polarized electrodes, said gasket being joined to peripheral edges of said current collectors.

2. An electric double layer capacitor according to claim 1, wherein said base of each of said current collectors comprises unvulcanized rubber, said current collectors being secured to said polarized electrodes by hot curing the unvulcanized rubber.

3. An electric double layer capacitor according to claim 1, wherein said base of each of said current collectors comprises a synthetic resin monomer of epoxy resin, said current collectors being secured to said polarized electrodes by coating the synthetic resin monomer.

4. An electric double layer capacitor according to claim 1, further comprising a separator means, interposed between said polarized electrodes, for preventing electrons from moving between said polarized electrodes while allowing ions to move therebetween.

5. An electric double layer capacitor, comprising:
    two polarized electrodes made of sintered activated carbon and being disposed in a non-contacting confronting relationship relative to one another, each of said polarized electrodes having an outside surface with pores thereon;
    two current collectors made of an electrically conductive material, each of said current collectors being affixed to said outside surface of one of said polarized electrodes so that portions of said current collectors are disposed within said pores; and
    a gasket disposed between said current collectors and surrounding said polarized electrodes, said gasket being affixed to said current collectors.

* * * * *